Dec. 28, 1965   R. G. PREISSER   3,226,104
UNIVERSAL CLAMPING DEVICE
Original Filed March 11, 1963   3 Sheets-Sheet 1
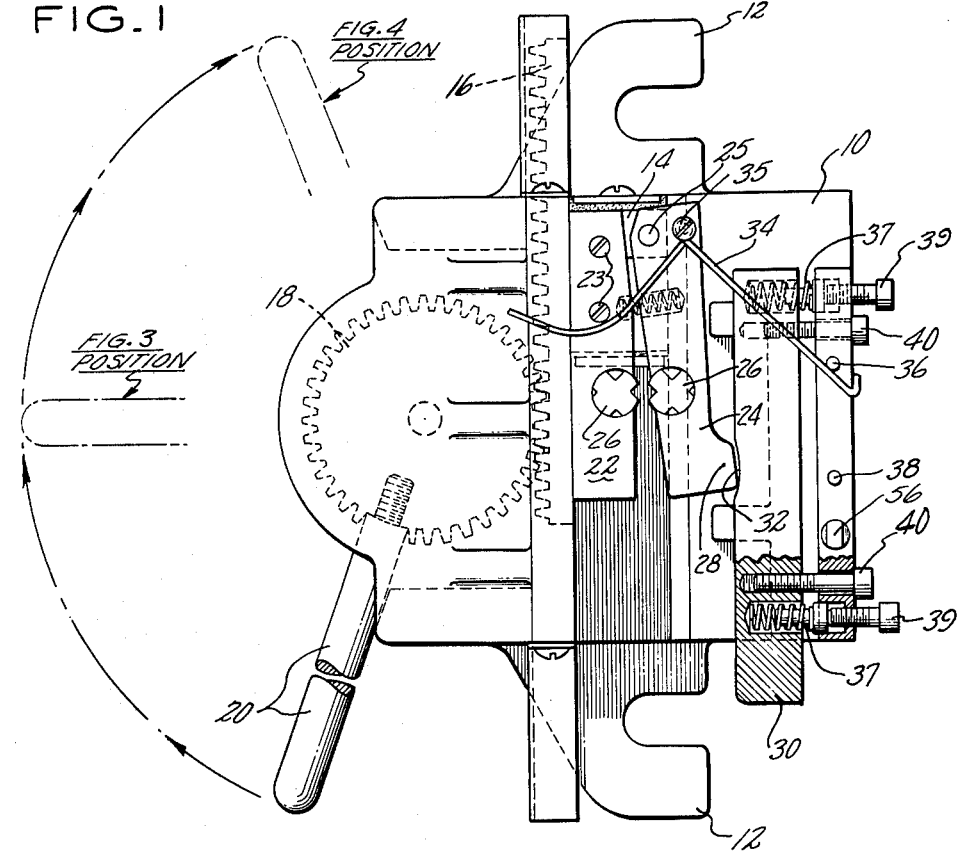
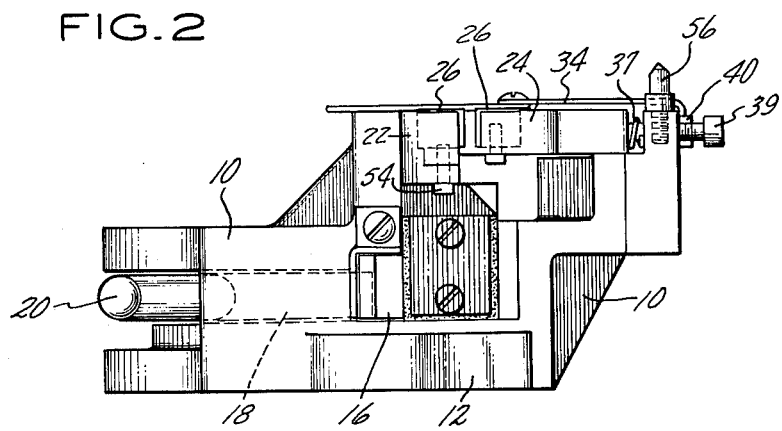

Dec. 28, 1965   R. G. PREISSER   3,226,104
UNIVERSAL CLAMPING DEVICE
Original Filed March 11, 1963   3 Sheets-Sheet 2
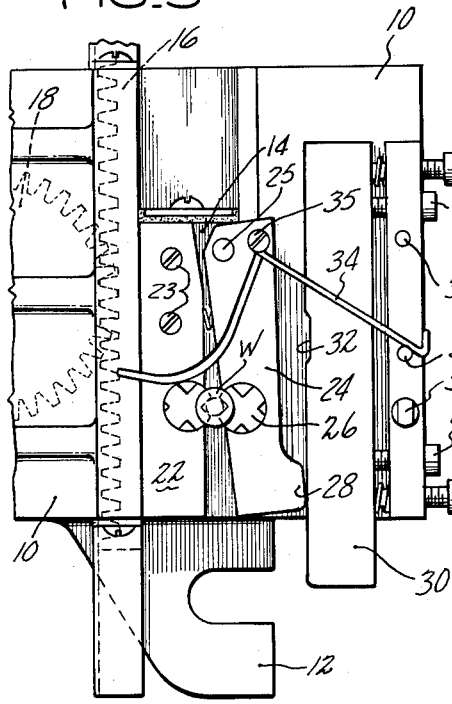
FIG.3
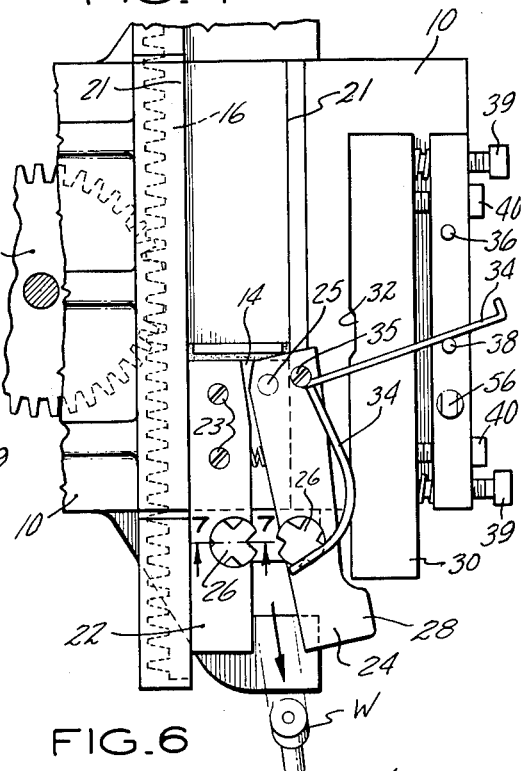
FIG.4
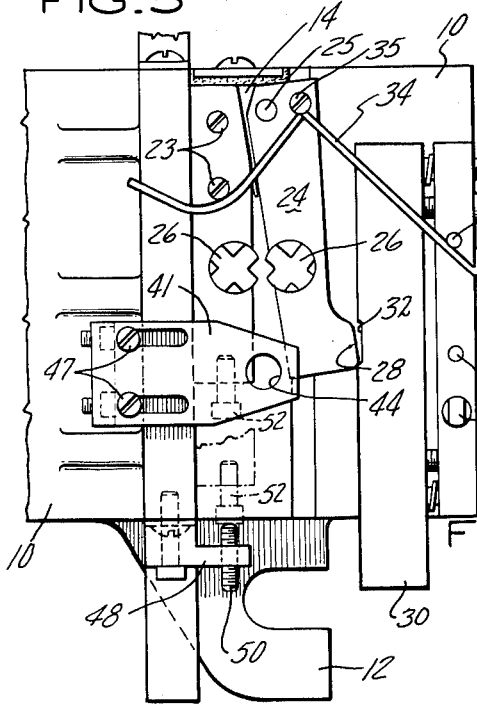
FIG.5
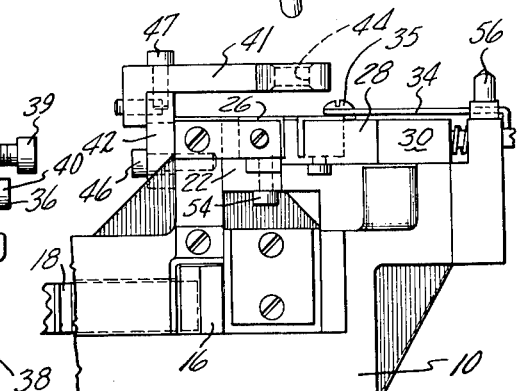
FIG.6
FIG.7
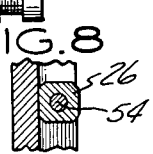
FIG.8
INVENTOR
R. G. Preisser
BY Joseph M. Schofield
ATTORNEY Dec. 28, 1965   R. G. PREISSER   3,226,104
UNIVERSAL CLAMPING DEVICE
Original Filed March 11, 1963   3 Sheets-Sheet 3

INVENTOR
R. G. Preisser
BY
Joseph K. Schofield
ATTORNEY

United States Patent Office 3,226,104
Patented Dec. 28, 1965

3,226,104
UNIVERSAL CLAMPING DEVICE
Raymond G. Preisser, Farmington, Conn.
(R.F.D., Forestville, Conn.)
Continuation of application Ser. No. 265,012, Mar. 11, 1963. This application Nov. 9, 1964, Ser. No. 409,772
6 Claims. (Cl. 269—227)

This application is a continuation of my application Ser. No. 265,012, filed Mar. 11, 1963, now abandoned.

This invention relates to a work clamping device for use in retaining a work piece in position during a cutting or other operation while mounted on the table of a machine tool and for ejecting the work piece from the device after completion of the operation.

A primary object of the invention is to provide a pair of work clamping jaws, one jaw being fixed and the other mounted for pivotal movement toward the other, both jaws being mounted on the upper surface of a slide housed and movable within a supporting body member.

Another object of the invention is to provide a cam member on the body member engaged by the pivotal jaw during movement of the slide so that a work piece may be positioned between the jaws when slightly opened in an initial position of the slide and then clamped therebetween in advanced slidable positions of the slide.

A feature of importance of the invention is that the member having the cam surface may be adjusted toward and from the slidable jaws to accommodate work pieces of different diameters and resiliently pressed toward a limited position toward the slidable jaws to apply the clamping pressure.

Another object of the invention is to provide ejecting means for the work piece acting after operation on the work piece has been completed to eject the work piece from between the jaws when the jaws have been moved with the slide to the end of their sliding movement.

And finally it is an object of the invention to provide fixed guiding means on the body member for a drill or other tool and to provide limiting means for the sliding movement of the slide to retain a work piece in fixed position below the guiding means during operation.

With the above and other objects in view, the invention may include the features of construction and operation set forth in the following specification and illustrated in the accompanying drawings.

In the accompanying drawings annexed hereto and forming a part of this specification, I have shown the invention embodied in a device adapted to be mounted on the table of a machine tool, but it will be understood that the invention can be otherwise embodied and that the drawings are not to be construed as defining or limiting the scope of the invention, the claims appended to this specification being relied upon for that purpose.

In the drawings:

FIG. 1 is a plan view of one form of the device made according to the present invention with the work clamping jaws in their retracted partially open loading position;

FIG. 2 is an end view in elevation of the device shown in FIG. 1;

FIG. 3 is a fragmentary plan view of the clamping device shown in FIGS. 1 and 2, the jaws being moved from their loading position to a clamping or operative position, the slide mounting the jaws being moved to an intermediate position;

FIG. 4 is a view similar to FIG. 3 with the slide and jaws shown in their advanced work ejecting position;

FIG. 5 is a plan view of the device shown in FIGS. 1 to 4 adapted for a drilling operation, showing a bracket fixed to the body member for guiding a drill or other tool rotatable in a fixed spindle above the table on which the clamping device is mounted and having means to limit movement of the slide to an intermediate work clamping position;

FIG. 6 is an end view in elevation of the device shown in FIG. 5;

FIG. 7 is a detail vertical view of one of the work clamping members, the view being shown in section taken on the plane of line 7—7 in FIG. 4;

FIG. 8 is a plan view of the work clamping member shown in FIG. 7, the view being taken on the plane of line 8—8 in FIG. 7;

Figure 9:
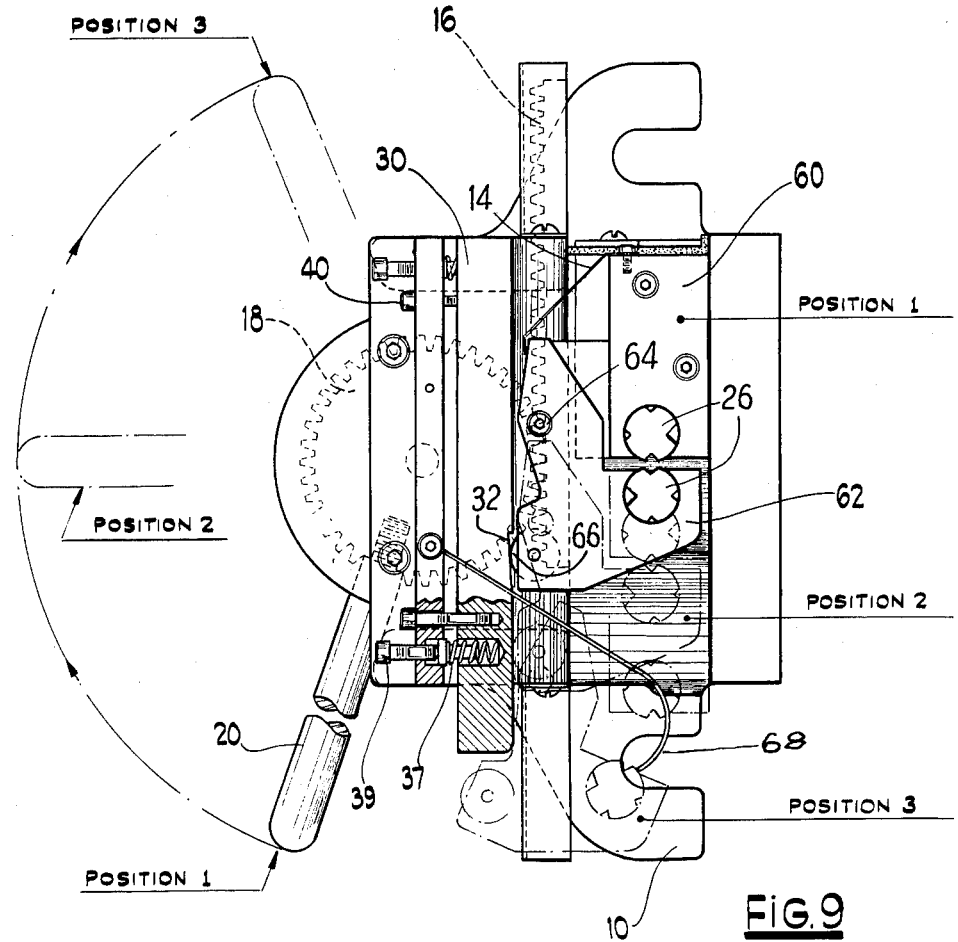
FIG. 9 is a plan view of a modified form of the device, the slide carrying the clamping jaws being shown in three successive positions.

In the above-mentioned drawings, there has been shown but one embodiment of the invention and a modification which are now deemed preferable, but it is to be understood that changes and modifications may be made within the scope of the appended claims without departing from the spirit of the invention.

Referring more in detail to the above referred to drawings and first to FIG. 1, it will be seen that the device comprises a body member 10 adapted to be movably mounted on or secured in fixed position to the table of a machine tool. To secure the clamping device to a table, lugs 12 are provided at opposite ends to receive bolts or other fastening means entering T slots in the table. On the body member 10 is a slide 14 movable in a horizontal plane. To move this slide 14 a rack 16 is provided extending along one of its sides and engaging the teeth of a gear 18 rotatably mounted on the body member. To rotate this gear 18 a hand lever 20 extends radially therefrom as shown. Operation of the handle 20 moves the slide 14 in a straight line between parallel ways 21 provided on the body member 10.

On the upper surface of this slide 14 are work clamping jaws one of which 22 is fixed rigidly to the slide 14 by any appropriate means, such as screws 23. The opposite jaw 24 is pivoted at one end to the slide 14 for pivotal movement about stud 25 toward and from the fixed jaw 22. Within each jaw 22 and 24 is fitted a work clamping member 26 for work pieces W of different diameter presently to be described more in detail. The pivotally mounted jaw 24 is provided with a lateral projection 28 at its free end adapted for engagement with the surface of a bearing member 30 adjustably mounted along one side of the slide 14. Within the surface of this bearing member 30 contacting the projection 28 is a recessed portion 32 forming a cam surface. In the position shown in FIG. 1 the slide 14 is in its initial or loading position so that the free end of the pivotal jaw 24 engages the cam portion 32 of the bearing member 30. In this position the jaws 22 and 24 are slightly separated to permit insertion of a work piece W between the inserted members 26 positioned within adjacent surfaces of the jaws. Forward movement of the slide 14 forces the pivotal jaw 24 toward the fixed jaw 22 by reason of the free end of the pivotal jaw 24 passing beyond the cam 32 surface of the backing member 30. The work piece W is therefore firmly clamped between the jaws during this movement of the slide and jaws.

Continued movement forwardly of the jaws 22 and 24 with the slide 14 causes the free end of the pivotal jaw 24 to pass beyond the end of the backing member 30 so that the jaw 24 may swing away from the companion jaw 22 for enough to permit the work piece W to fall from the device. To aid in ejecting the work piece W from the device, a spring wire member 34 is pivotally mounted on the pivotal jaw 24 for swinging movement about the screw 35, one end being movable between spaced studs 36 and 38 upstanding from a fixed portion of the body member 10. The opposite end of this spring wire member 34 is curved as shown so that as the jaws 22 and 24 move forward the curved end swings against the side of the work piece W. As soon as the free end 28 of the pivotal jaw 24 passes beyond the end of the backing member 30 and the jaws 22 and 24 open, the pressure of the spring member 34 against the work piece W is great enough to eject the work piece from the device.

As best shown in FIG. 1 of the drawings, the bearing member 30 is spring pressed forwardly against the pivotal jaw 24 by helical springs 37 housed within the backing member 30. The pressure of these springs 37 may be varied by screws 39 bearing against an abutment member engaging against the outer ends of the helical springs 37. To limit the forward movement of the bearing member 30, headed screws 40 are provided threaded into the bearing member 30, their shanks passing freely through the fixed portion of the body member 10. The movement of the bearing member 30 is therefore limited by the heads of the screws 40 taking up against the outer surface of the fixed portion of the body member 10.

To adapt the device for drilling or other operations on a work piece W retained between the clamping member 26 in the jaws 22 and 24 while the slide 14 and jaws 22 and 24 are in a fixed predetermined position, a bracket member 41 is fixed in position on a side surface of the body member 10 by a vertically adjustable member 42 so that with the body member 10 clamped to a machine tool table a central opening 44 in the bracket 41 will be positioned directly in alignment with the fixed axis of a rotatable tool spindle (not shown) of the machine tool on the table of which the device is mounted. The bracket member 41 as shown in FIG. 5 is vertically adjustable by screws 46 entering the body member 10 and extending through slots formed in the vertical member 42 of the bracket. Also screws 47 respectively engaging elongated slots formed in the horizontal member 41 and threaded into the vertical member 42 permit horizontal adjustment of the bracket member 41.

To limit the forward movement of the slide 14 and jaws 22 and 24 during this type of operation to bring the work piece W directly below the opening 44 in the bracket member 41, an adjustable stop is provided. A small bracket 48 is fastened to the end of the body member 10 adjacent one end of one of the jaws 22 and overhanging the path of movement of the jaw. The outer end of this bracket 48 is provided with an adjusting screw 50, the inner end of which bears against an abutment or screw 52 extending from the end of the jaw 22. With the end of the screw bearing against the end of the jaw 22, the opening 44 in the bracket 40, after proper adjustment of the screws 50 and 52, will be directly below the axis of a spindle (not shown) on the machine.

To employ the device for these drilling operations the slide 14 and jaws 22 and 24 are first moved to their rearward position in which position the pivotal jaw 24 has its free end entering the recessed cam surface 32 to slightly separate the jaws. In this position of the jaws a work piece W may be placed between the work engaging members 26 after which the slide 14 and jaws 22 and 24 are advanced to their position limited by the adjustable stop 48–50. In this position the axis of the work piece W will be directly in alignment with the opening 44 in the bracket 40 above the jaws 22 and 24. Also in this operating position the work piece W is firmly clamped by the free end of the pivotal jaw 24 bearing against the unrecessed portion of the bearing member 30.

To locate work pieces W accurately between the jaws 22 and 24, the cylindrical members 26 referred to above are inserted in recesses formed in the jaws as shown in FIGS. 1, 3, 4 and 5. These inserted members 26 are in positions directly opposite each other and each member 26 has a series of V-shaped notches of different sizes formed in its periphery. Work pieces therefore may be inserted within opposed notches to clamp work pieces of different diameters in position. The member 26 within the fixed jaw 22 is adjustable to different rotative positions to present a notch of the proper size for the particular diameter of the work piece W being operated on. For this purpose the lower end of this inserted member 26 is squared as shown in FIGS. 7 and 8 and fits a slot or recess in the bottom of the recess for the inserted member. A screw 54, threaded into the lower end of the inserted member 26, retains the member in adjusted rotated position. The inserted member 26 in the pivotally mounted jaw member 24 may be rotatable within its recess so that its V notches will position themselves properly relative to the surface of the work piece W.

For operations upon work pieces by a grinding wheel (not shown) by passing the work piece W below the grinding surface it is convenient to have a dressing tool in position for reconditioning the grinding surface. For that purpose a diamond dressing tool 56 is mounted in a vertical position on a horizontal surface of the body member 10.

Figure 10:
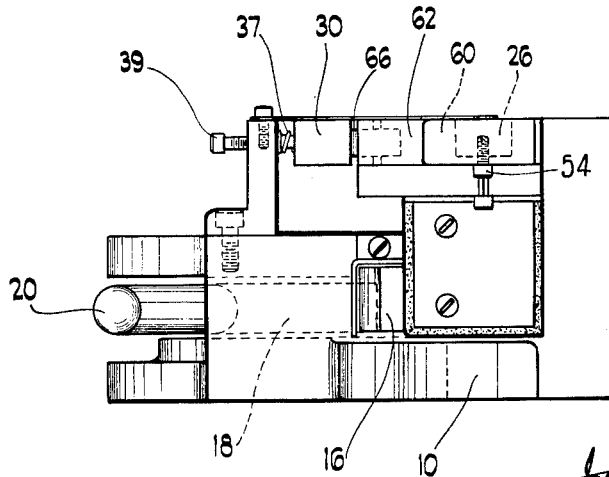
FIG. 10 is an end elevation of the device shown in FIG. 9.

Referrng to the form of the invention shown in FIGS. 9 and 10, it will be seen that the body member 10, slide 14 and the operating means for the slide 14 are in every way similar to those shown in the preceding figures. The clamping jaws 60 and 62 for the work piece, however, are disposed so that the clamping action of the pivoted jaw 62 is in a direction parallel to movement of the slide 14 instead of normal thereto as in the earlier described form of the invention. Fixed jaw 60 is secured to the upper surface of the slide 14 by suitable screws as shown. Jaw 62 is pivoted at 64 and preferably is provided with a roller 66 at its outermost end for engagment with a cam surface.

Bearing member 30 operates in every way similar to that shown in FIGS. 1 to 6 but as shown is mounted at the front of the device instead of at the rear. At an intermediate position along this bearing member the bearing surface is provided with a recess 33 similar to the recess shown in FIGS. 1, 3, 4 and 5. Movement of the slide 14 by lever 20 actuates the slide 14 from a retracted position in which the roller 66 is within the recess 32 formed in the bearing member. In this position of the slide 14 and jaw 62 a work piece may be inserted between the clamping surfaces of the jaws.

Movement forward of slide 14 serves to engage the roller 66 with the plane surface of the bearing member 30 and firmly clamps the work piece. When the slide 14 is moved to its advanced position, roller 66 runs off the end of the bearing member 30 and permits opening of the jaws 60 and 62. At this point in the movement of slide 14 the work piece contacts spring 68 adjacent its free end and forces the work piece laterally from the device. As shown, spring 69 has one of its ends attached in fixed position to an upper surface of the body member 10.

It will be seen that the pivotally mounted jaw 62 comprises a three armed lever, the pivot 64 being at an intermediate part of said lever. The work clamping member for this jaw is at the end of one of the arms. Another arm carries the cam engaging roller 66. With jaw member 62 formed and actuated in this manner, the movement of the work clamping member 26 on jaw 62 moves in a direction parallel to the movement of the slide 14 when clamping a work piece. The lateral position of a cylindrical work piece therefore is always with its axis centrally disposed relative to the clamping members. Variations in diameter of work pieces therefore will not vary the position of a work piece laterally.

I claim as my invention:

1. A clamping device for work pieces being operated on in a machine tool, comprising
   a body member adapted for attachment to the table of a machine tool and having a guideway therein, a slide movable along said guideway,
mechanical means to actuate said slide,
work clamping jaws on said slide, one of said jaws being fixed to the slide and the other pivotally mounted thereon for swinging movement toward and from the fixed jaw,
and a generally longitudinally extending cam on said body member having a cam surface engaging said pivotally mounted jaw member during its movement to slightly pivot said jaw, whereby said pivotally mounted jaw may be moved from its work piece receiving position to a work piece clamping position during a portion of the movement of said slide.

2. A clamping device for work pieces being operated on in a machine tool, comprising
a body member adapted for attachment to the table of a machine tool and having a guideway therein,
a slide movable along said guideway,
mechanical means to actuate said slide,
work clamping jaws on said slide, one of said jaws being fixed to said slide and the other jaw being pivotally mounted adjacent one end for swinging movement toward and from the fixed jaw,
and a generally longitudinally extending cam on said body member having a cam surface engaging the free end of said pivotally mounted jaw member during movement of said slide and jaws to slightly pivot said jaw, whereby said pivotally mounted jaw may be moved from its work piece receiving position to its work piece clamping position during a portion of the movement of said slide.

3. A clamping device for work pieces being operated on in a machine tool, comprising
a body member having a guideway therein,
a slide movable along said guideway,
rack and gear means to actuate said slide,
work clamping jaws on said slide, one of said jaws being pivotally mounted for swinging movement toward and from the other jaw,
and longitudinally extending cam means engaging said pivotally mounted jaw during movement of said slide and jaws, whereby said pivotally mounted jaw may be moved from its work piece loading position to its clamping position during a portion of the movement of said slide and may be moved to a work releasing position at the end of the slide movement.

4. A clamping device for work pieces being operated on in a machine tool, comprising
a body member adapted for attachment to the table of a machine tool and having a guideway therein,
a slide movable along said guideway,
means to reciprocate said slide,
work clamping jaws on said slide, one of said jaws being fixed to said slide, the other jaw being pivotally mounted for movement toward and from the first jaw,
and a generally longitudinally extending cam on said body member extending in the direction of the movement of said slide and having a cam surface engaging said pivotally mounted jaw during movement of said slide and jaws to slightly oscillate said pivotally mounted jaw, whereby the clamping surfaces of said pivotally mounted jaw are moved in the direction of movement of said slide from work piece receiving position to work piece clamping position.

5. A clamping device for work pieces being operated on in a machine tool, comprising
a body member adapted for attachment to the table of a machine tool and having a guideway therein,
a slide movable along said guideway,
means to reciprocate said slide,
a pair of work clamping jaws on said slide, one of said jaws being fixed to said slide,
the other jaw being pivotally mounted thereon for swinging movement toward and from the first jaw,
and a generally longitudinally extending cam on said slide having a cam surface engaging said pivotally mounted jaw throughout movement of said slide whereby said pivotally mounted jaw may be moved to its work piece clamping position in the direction of movement of said slide during a portion of the movement of said slide and disengaged from said cam surface at the end of movement of said slide.

6. A clamping device for work pieces being operated on in a machine tool, comprising
a body member adapted for attachment to the table of a machine tool having a guideway thereon,
a slide movable along said guideway,
means to reciprocate said slide,
work clamping jaws on said slide,
a generally longitudinally extending cam on said body member having a cam surface thereon,
one of said jaws being fixed to said slide,
the other jaw comprising a three armed lever, one arm of which carries a work piece clamping jaw, another arm of which has a member engaging said cam surface during movement of said slide, and the third arm of which provides a pivot for said lever, whereby oscillation of said lever about said pivot during movement of said slide permits a work piece to be positioned between said jaws at one end of the slide movement, clamped therebetween during intermediate portions of said slide movement and finally released therefrom at the opposite side of the slide movement.

References Cited by the Examiner
UNITED STATES PATENTS 509,310 11/1893 Heberling.
760,273 5/1904 Talbert _____ 81—112

WILLIAM W. DYER, Jr., *Primary Examiner.*
ROBERT C. RIORDON, *Examiner.*